United States Patent
Zhang (10) Patent No.: US 9,932,875 B2
(45) Date of Patent: Apr. 3, 2018

(54) MIXER FOR MIXING EXHAUST GAS (71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 15/058,743

(22) Filed: Mar. 2, 2016

(65) Prior Publication Data

US 2017/0254245 A1 Sep. 7, 2017

(51) Int. Cl.
*F01N 3/28* (2006.01)
*F02M 26/19* (2016.01)
*F01N 3/20* (2006.01)

(52) U.S. Cl.
CPC ......... *F01N 3/2892* (2013.01); *F01N 3/2066* (2013.01); *F02M 26/19* (2016.02); *F01N 2470/30* (2013.01); *F01N 2610/02* (2013.01)

(58) Field of Classification Search
CPC ....... F02B 47/00; B01D 53/94; F01N 3/2892; F01N 3/2066
See application file for complete search history.

(56) References Cited

U.S. PATENT DOCUMENTS

| | | | |
|---|---|---|---|
| 1,626,423 A | 4/1927 | Ostroff | |
| 5,207,714 A * | 5/1993 | Hayashi | F02M 26/18 123/568.17 |
| 8,756,923 B2 | 6/2014 | Tamamidis | |
| 2004/0050040 A1* | 3/2004 | Berriman | F01N 3/2892 60/324 |
| 2004/0237511 A1* | 12/2004 | Ripper | B01F 5/0268 60/286 |
| 2007/0022744 A1* | 2/2007 | Hemingway | F01N 3/033 60/286 |
| 2007/0193252 A1* | 8/2007 | McKinley | F01N 3/2066 60/286 |
| 2009/0044524 A1* | 2/2009 | Fujino | B01D 53/90 60/303 |
| 2010/0065028 A1* | 3/2010 | Styles | F02D 9/1035 123/568.17 |
| 2011/0041817 A1* | 2/2011 | Guerry | F02M 25/0722 123/568.17 |
| 2011/0061374 A1 | 3/2011 | Noritake | |
| 2012/0204845 A1* | 8/2012 | Gingrich | F02M 26/43 123/568.17 |
| 2013/0164182 A1* | 6/2013 | Iijima | F01N 3/2066 422/169 |

OTHER PUBLICATIONS

Zhang, Xiaogang, "System for a Urea Mixer," U.S. Appl. No. 14/945,122, filed Nov. 18, 2015, 30 pages.
Zhang, Xiaogang et al., "Urea Mixer," U.S. Appl. No. 15/042,680, filed Feb. 12, 2016, 35 pages.

* cited by examiner

*Primary Examiner* — Patrick Maines
(74) *Attorney, Agent, or Firm* — Julia Voutyras; McCoy Russell LLP (57) ABSTRACT

Systems are provided for a mixer configured to be used in either an intake or exhaust passage. In one example, a mixer in the intake passage may be adapted to mix EGR with intake air and a mixer in the exhaust passage may be adapted to mix urea with exhaust gas.

12 Claims, 7 Drawing Sheets

MIXER FOR MIXING EXHAUST GAS

FIELD

The present description relates generally to a mixer for mixing one or more of exhaust gas recirculation (EGR) and urea.

BACKGROUND/SUMMARY

In an effort to meet stringent federal government emissions standards, engine systems may be configured with a plurality of technologies for decreasing emissions. Specifically, it may be desired to address nitrogen oxide ($NO_x$) emissions. Two example technologies for decreasing $NO_x$ may include exhaust gas recirculation (EGR) and a selective catalytic reduction (SCR) device. Reducing $NO_x$ via EGR includes recirculating a controllable proportion of the engine's exhaust back into an intake passage to combine with intake air. The addition of EGR may not chemically participate in combustion (e.g., the gas is substantially inert) and may reduce an amount of cylinder contents available for combustion. This may lead to a correspondingly lower peak cylinder temperature and heat release. By doing this, $NO_x$ emissions may be decreased. Decreasing $NO_x$, via the SCR device includes a reductive reaction between $NO_x$ and ammonia ($NH_3$) facilitated by the SCR device, which converts $NO_x$ into nitrogen ($N_2$) and water ($H_2O$). $NH_3$ is introduced into an engine exhaust system upstream of an SCR catalyst by injecting urea into an exhaust pathway, or is generated in an upstream catalyst. The urea entropically decomposes to $NH_3$ under high temperature conditions.

However, as recognized by the inventors herein, issues may arise upon flowing EGR into the intake passage and/or upon injecting urea into the exhaust pathway. In one example, EGR is introduced into the intake passage before the intake passage divides upstream of a multi-cylinder engine. Desired EGR mixing with intake air may be difficult to achieve at various engine speeds/loads, which may lead to uneven distribution of the EGR/intake air mixture. For example, one cylinder may receive too much EGR, possibly resulting in increased particulate emissions, and another cylinder may receive too little EGR, possibly resulting in increased $NO_x$ emissions. As a second example, urea may poorly mix with exhaust gas (e.g., a first region of exhaust gas has a higher concentration of urea than a second region of exhaust gas of an exhaust passage) which may lead to poor coating of the SCR and poor reactivity between emissions (e.g., $NO_x$) and the SCR. Additionally, overly mixing and agitating the urea in the exhaust can likewise cause issues, such as increased deposits. Thus, both introduction of EGR into the intake passage and introduction of urea in the exhaust passage may succumb to poor mixing.

Attempts to address insufficient mixing include introducing a mixing device at a junction between an EGR outlet and an intake passage and/or to introduce a mixing device downstream of a urea injector and upstream of an SCR device such that dispersion of EGR or urea may be more homogenous. Further attempts include one or more of adjusting valve function to introduce a backpressure to an intake and/or exhaust passage and/or to include injectors with swirlers and/or other turbulence generating features.

However, the inventors herein have recognized potential issues with such systems. As one example, a mixing potential of mixers is limited. As an example, static mixers may be limited due to a velocity of gas flow due to their lack of vacuum or other mixing assisting features. Thus, the size of the mixers may be increased to overcome a dependence on gas velocity. However, increasing the size of the mixers may result in increasing a size of a gas passage, ultimately demanding significant modifications to a design of the gas passage. This may increase a production cost of a vehicle.

In one example, the issues described above may be addressed by a system comprising a hollow teardrop-shaped mixer comprising an inlet at a downstream spherically-rounded end and a plurality of outlets located along a maximum diameter of the mixer, the mixer radially spaced away from a pipe, a diameter of the mixer along a central axis continually decreases from the maximum diameter to upstream and downstream ends relative to a direction of gas flow. In this way, the mixer may be adapted to mix EGR in an intake passage or urea in an exhaust passage without significant modifications to the intake or exhaust systems, respectively.

As one example, the radial space between the mixer and the pipe is inversely proportional to the diameter or the mixer such that the radial distance increases as the mixer diameter decreases. In this way, the radial space between the mixer and the pipe may be a venturi passage located around an entire circumference of the mixer. The venturi passage may generate a vacuum at a venturi throat, which may be supplied to an interior space of the mixer through the outlets. The vacuum may promote mixing inside the mixer along with promoting a gas mixture to flow through the outlets and into a passage of the pipe. The mixer may be configured to be located in an intake passage or an exhaust passage, where the mixer may mix EGR with intake air or urea with exhaust gas, respectively. In this way, an easy to manufacture, compact, and cost-efficient mixer may be adapted to mix EGR or urea.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-7 are shown approximately to scale, however, other alternate dimensions may be used.

DETAILED DESCRIPTION

Figure 1:
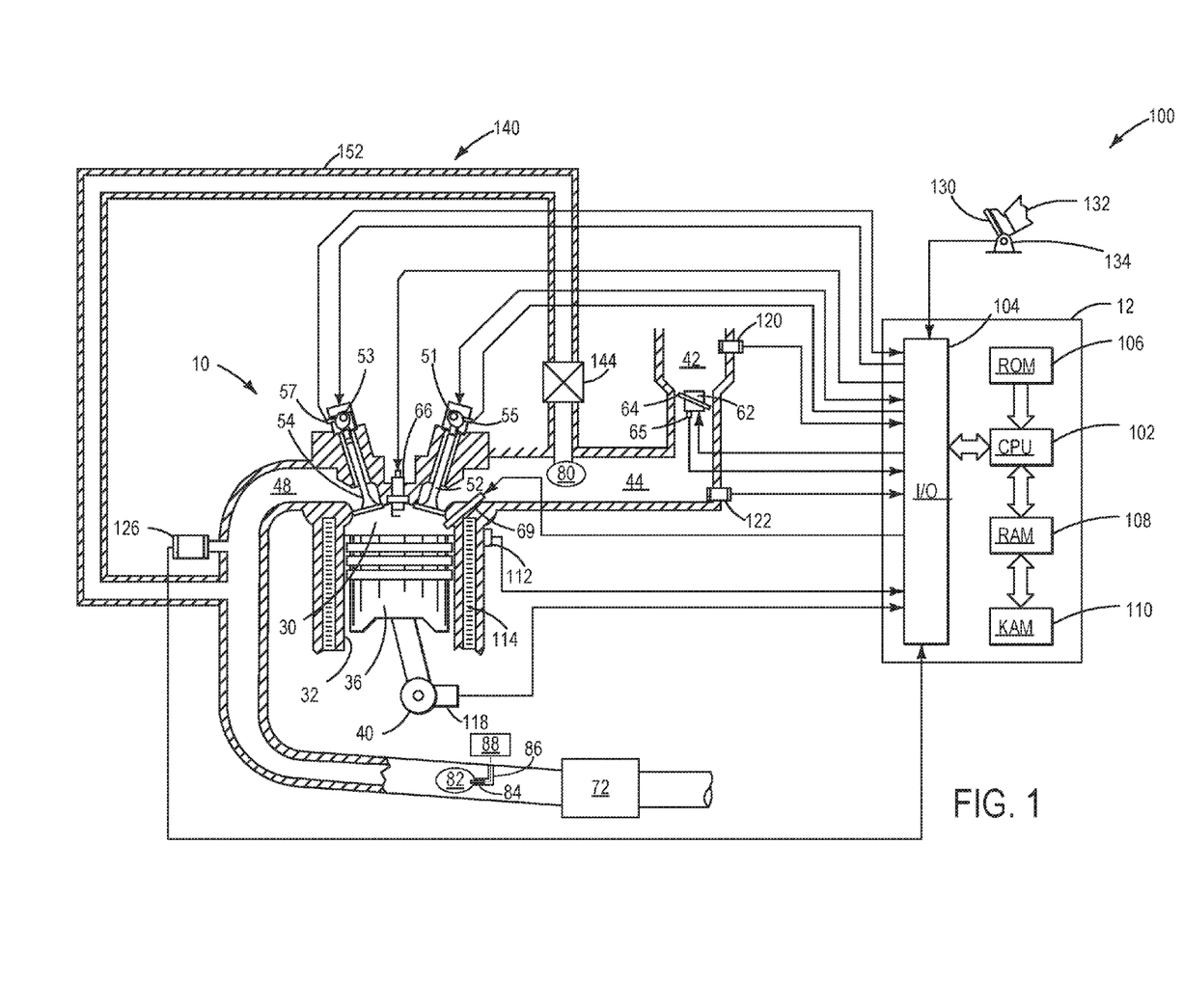
FIG. 1 shows a schematic view of an engine with at least one mixer.
Figure 2:
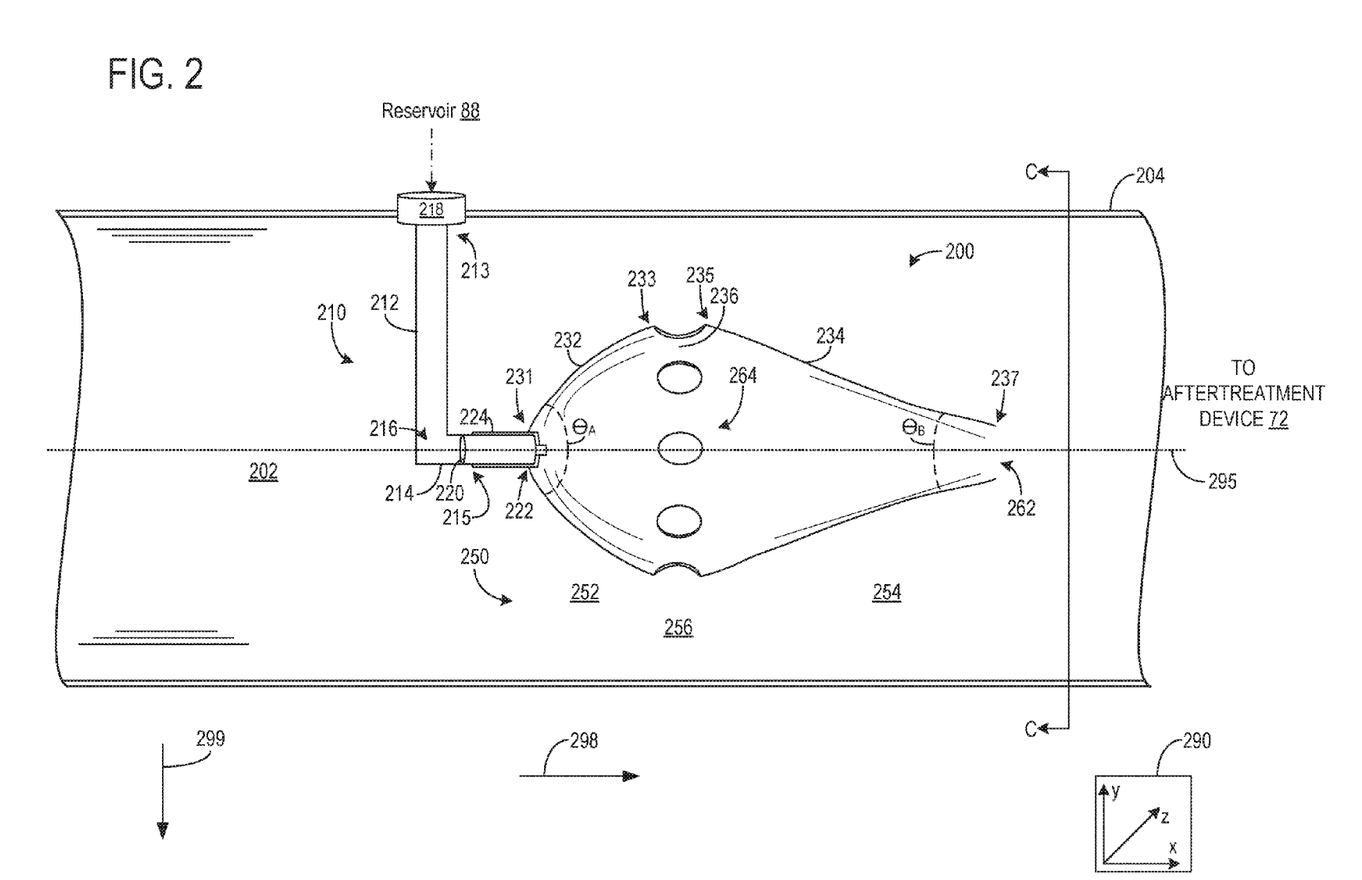
FIG. 2 shows an isometric view of a urea mixer located in an exhaust passage.
Figure 3:
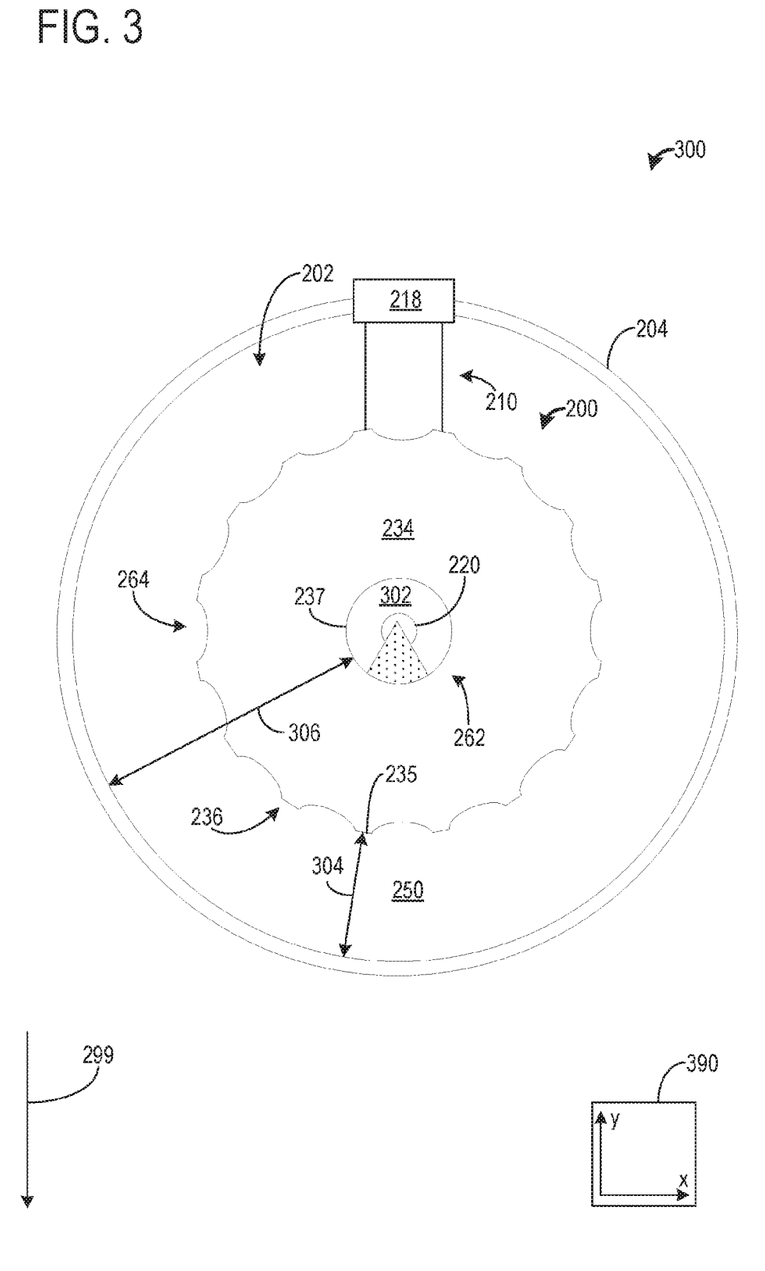
FIG. 3 shows a downstream-to-upstream view of the urea mixer.
Figure 4:
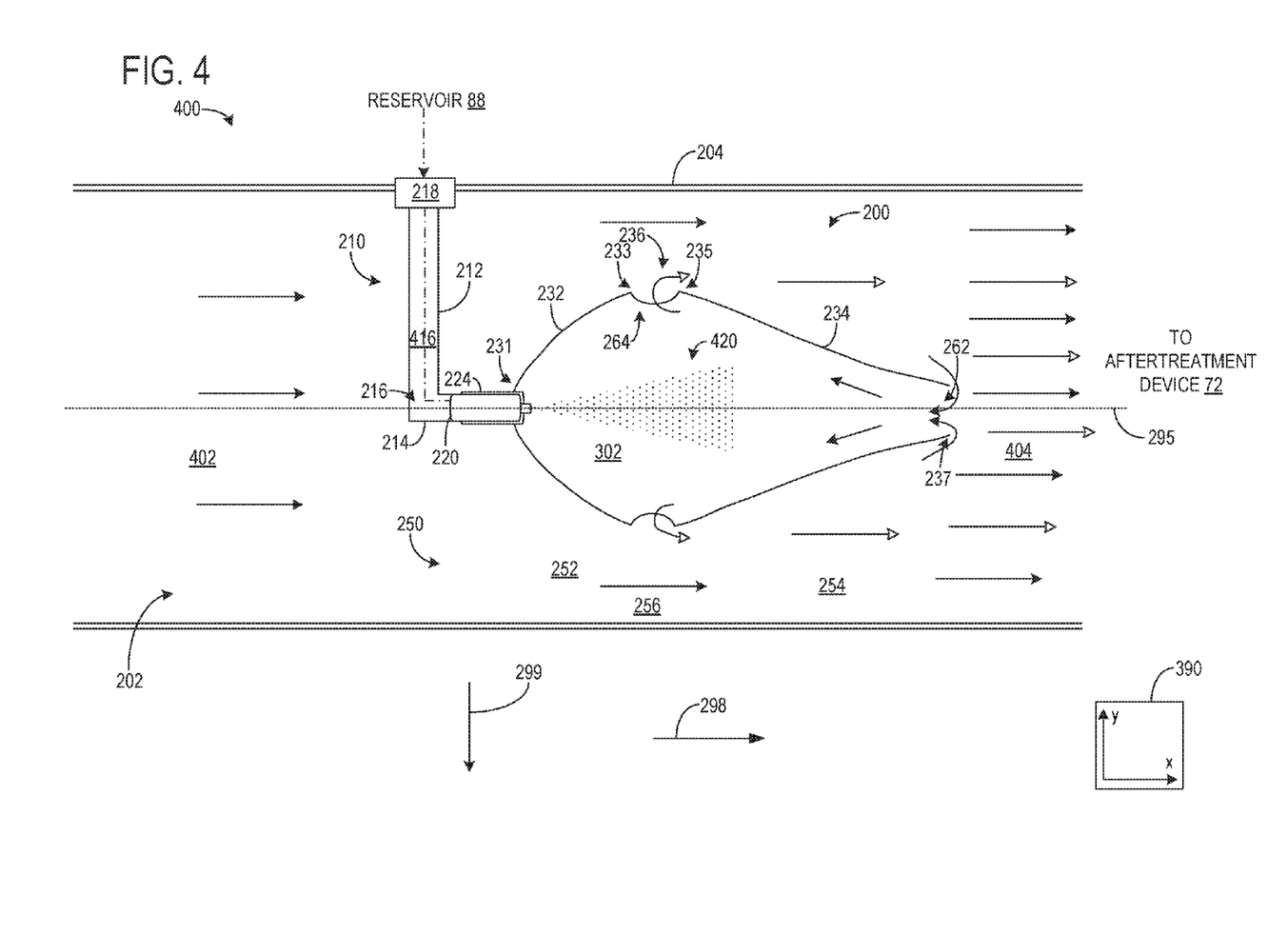
FIG. 4 shows a cross-section of the urea mixer with an example exhaust flow mixing with urea.
Figure 5:
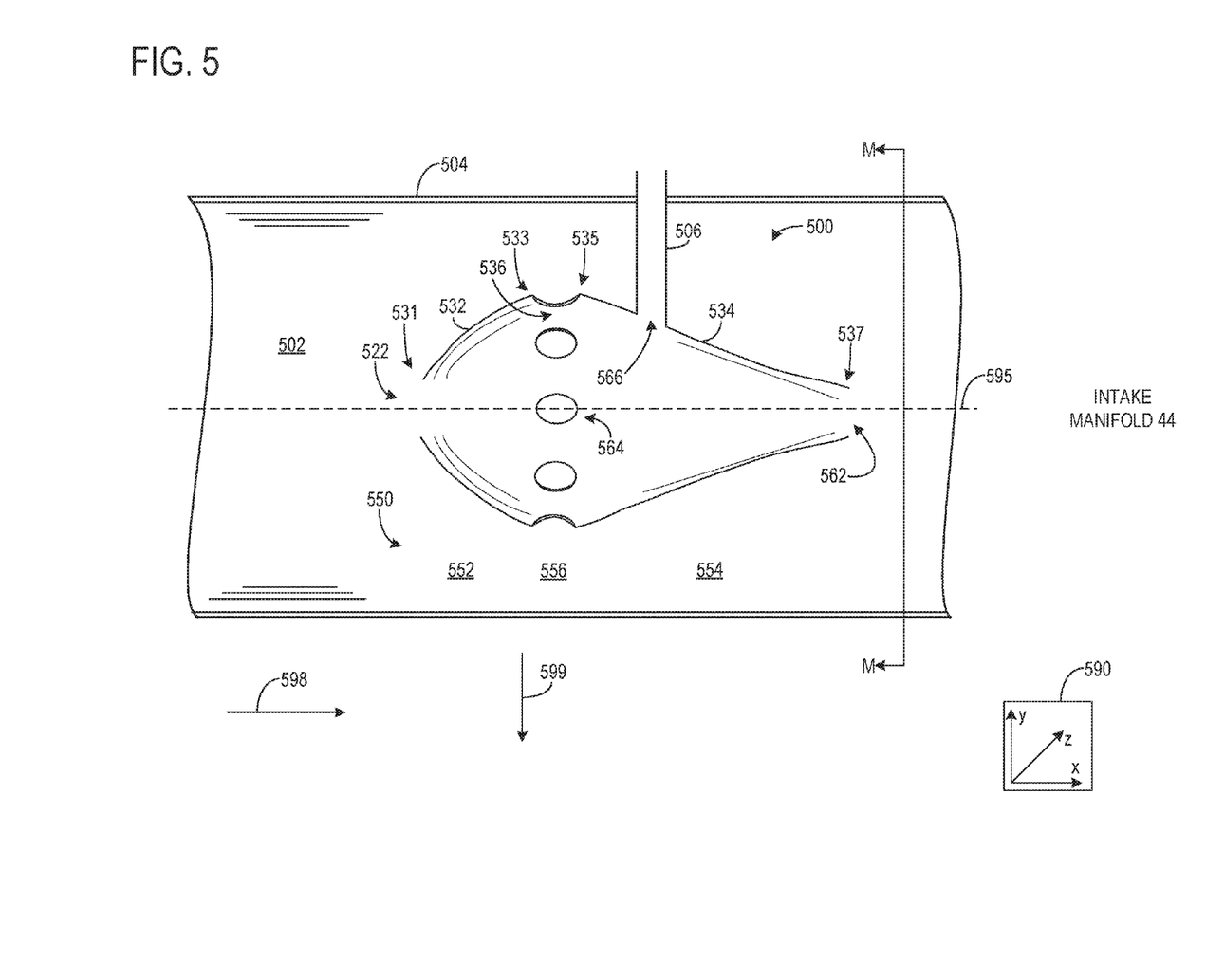
FIG. 5 shows an isometric view of an EGR mixer located in an intake passage.
Figure 6:
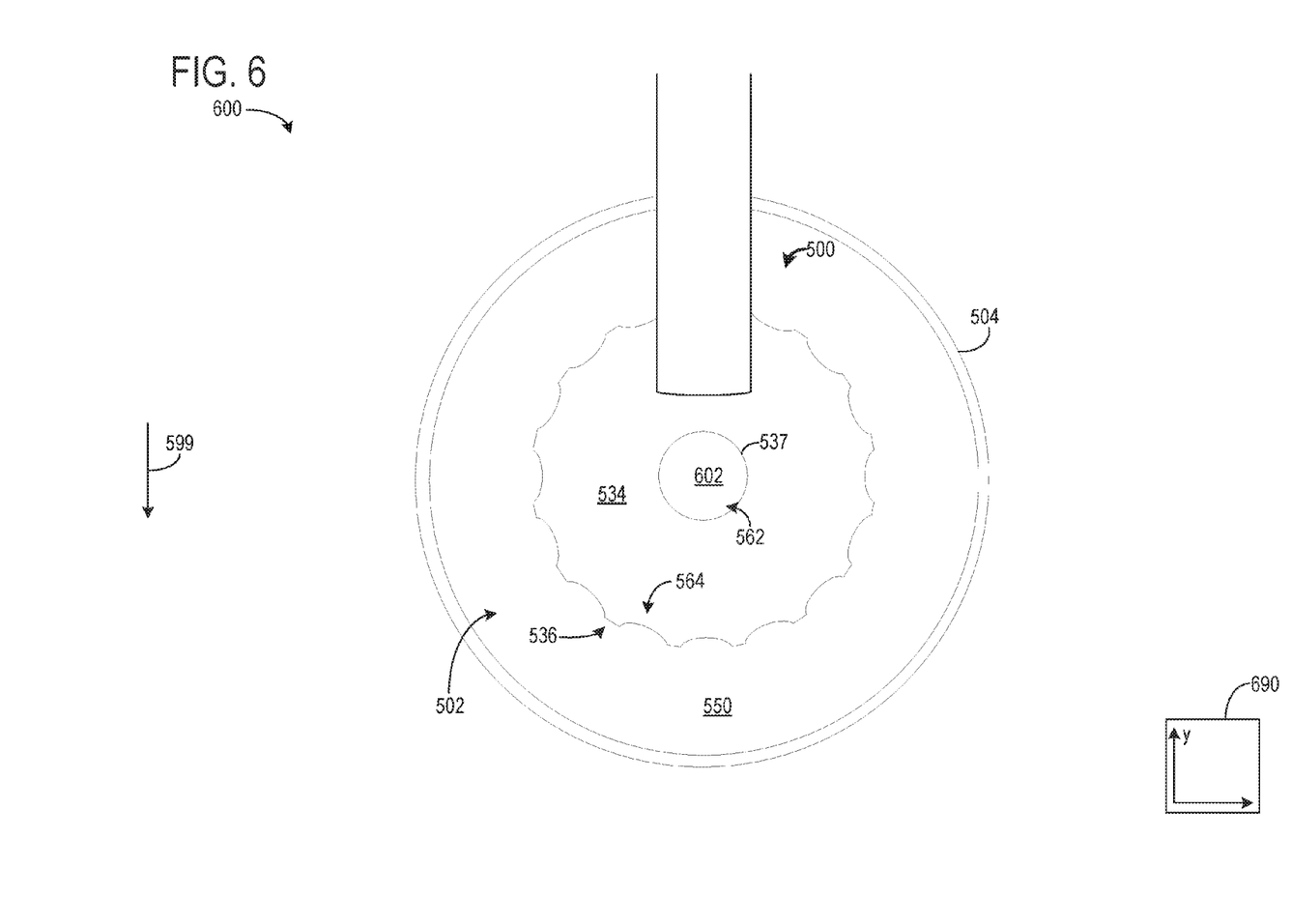
FIG. 6 shows a downstream-to-upstream view of the EGR mixer.
Figure 7:
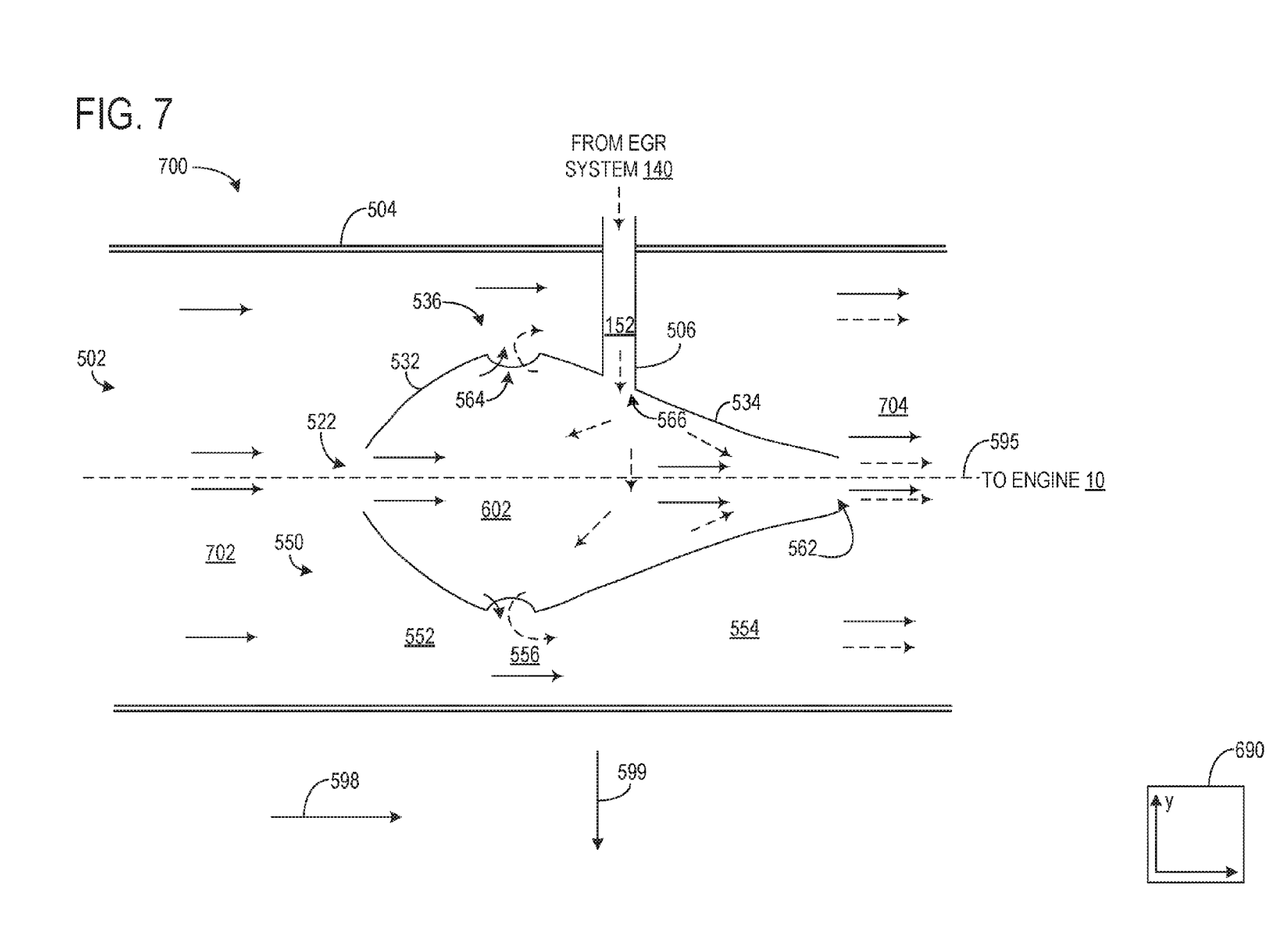
FIG. 7 shows a cross-section of the EGR mixer with an example intake flow mixing with EGR.

The following description relates to systems for a mixer. The mixer may be a static mixer located in an intake and/or exhaust passage. A mixer located in an intake passage may be configured to receive EGR and ambient air in a chamber, where the EGR and ambient air may mix before flowing to one or more cylinders of an engine. A mixer located in an exhaust passage may be substantially similar to the mixer in the intake passage. A mixer in the exhaust passage may be configured to receive exhaust gas with an injector positioned to inject urea into a chamber of the mixer. In this way, the mixer in the intake passage may be an EGR mixer and the mixer in the exhaust passage may be a urea mixer. In one example, the differences between the EGR mixer and the urea mixer include the EGR mixer being fluidly coupled to an EGR passage and the urea mixer being fluidly coupled to a urea injector. The differences and similarities between the mixers will be described in further detail below. The mixers may be used with an engine, as shown in FIG. 1. The urea mixer forms an annular venturi passage located between the urea mixer and an exhaust pipe. The venturi passage may promote urea mixing in the urea mixer, as shown in FIG. 2. A downstream view of the urea mixer is shown in FIG. 3. Exhaust may flow into the urea mixer and mix with urea, as shown in FIG. 4. The EGR mixer forms an annular venturi passage between an intake pipe and outer surfaces of the EGR mixer, as shown in FIG. 5. The EGR mixer further comprises an inlet and an outlet aligned along a common axis, which may promote EGR flow proximal to a central axis of the intake passage. The EGR mixer further comprises a plurality of perforations aligned along a common axial axis of the mixer, where the perforations may directed EGR and ambient air to flow radially outward into the intake passage. A downstream view of the EGR mixer is shown in FIG. 6, respectively. Ambient air may enter the EGR mixer and merge with EGR before flowing to different portions of an intake passage, as shown in FIG. 7.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Furthermore, elements may be described as substantially equal, similar, identical, etc. to one another. Substantially equal, constant, similar, etc. may be described as a deviation between two similar elements being within 1-5% of each other due to manufacturing tolerances.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 72 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 72 is shown arranged along the exhaust passage 48 downstream of both the exhaust gas sensor 126 and a mixer 82. In one example, the mixer 82 is a urea mixer. The device 72 may be a three way catalyst (TWC), $NO_x$ trap, selective catalytic reductant (SCR), various other emission control devices, or combinations thereof. In some examples, during operation of the engine 10, the emission control device 72 may be periodically reset by operating at least one cylinder of the engine within a particular air-fuel ratio.

The urea mixer 82 is shown upstream of the emission control device 72 and downstream of the exhaust gas sensor 126. In some embodiments, additionally or alternatively, a second exhaust gas sensor may be located between the urea mixer 82 and the emission control device 72. An injector 84 is positioned to inject fluid into the mixer 82. The injector 84 is fluidly coupled to a reservoir 88 comprising a fluid, where the fluid may be a reductant (e.g., urea) in one example. Urea may flow from the reservoir 88 to the injector 84 via a hollow channel located in a tube 86. The mixer 82 may be an annular protrusion extending into the exhaust passage 48. The mixer 82 is configured to receive exhaust gas and further comprises a chamber for mixing the urea and exhaust gas. The mixer 82 expels exhaust gas via a vacuum effect generated by an annular venturi passage located between outer surfaces of the urea mixer 82 and an exhaust pipe. The urea mixer 82 will be described in greater detail below with respect to FIGS. 2 and 3.

An exhaust gas recirculation (EGR) system 140 may route a desired portion of exhaust gas from the exhaust passage 48 to the intake manifold 44 via an EGR passage 152 fluidly coupled to an EGR mixer 80. The EGR mixer 80 may be substantially similar to the urea mixer 82 in one example. The EGR mixer 80 may include at least one inlet for admitting ambient air into a chamber of the mixer. The EGR passage 152 is fluidly and physically coupled to the EGR mixer 80 as shown. In one example, an entire amount of EGR from the EGR passage 152 flows through the EGR mixer 80 before entering the intake manifold 44. The EGR mixer 80 may include one or more outlets for expelling ambient air and EGR into the intake manifold 44. In some examples, the EGR mixer 80 may expel ambient air and/or EGR upstream of the intake manifold 44 in the intake passage 42. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting a reactivity of the SCR may include adjusting an actuator of the urea injector to inject urea to cover surfaces of the SCR with urea. For example, adjusting an injection into the mixer may include adjusting an actuator of the injector to open an orifice of the injector to spray an amount of fluid into the mixer.

Thus, a mixer may be used in an intake passage and/or an exhaust passage. The mixer is radially spaced away from a pipe of the intake or exhaust passages. The mixer may comprise first and second opening located at upstream and downstream extreme ends, respectively. The mixer may further comprise a plurality of outlets located along a greatest diameter corresponding to a middle portion of the mixer. The diameter of the mixer may decrease from the middle to the first opening in an upstream direction at a first rate. The diameter of the mixer may decrease from the middle to the second opening in a downstream direction at a second rate. In one example, the first rate may be greater than the second rate. Thus, a first length of the mixer between the first opening and the middle portion may be less than a second length of the mixer between the middle portion and the second opening. Thus, the radial space between the mixer and the pipe may be an asymmetric venturi passage located around and entire circumference for an entire length of the mixer. For a mixer located in an intake passage, the mixer may further comprise a third opening between the middle portion and the second opening, where the third opening is configured to admit EGR into an interior space of the mixer. Thus, the mixer in the intake passage is adapted to receive intake air via the first opening and to receive EGR via the third opening. The intake air and EGR may mix in the interior space of the mixer before flowing out of the mixer via the second opening or the plurality of outlets. For a mixer located in the exhaust passage, the mixer may further comprise a urea injector protruding through the first opening, where the injector is configured to inject urea into the interior space of the mixer. The second opening may admit exhaust gas into the interior space, where the exhaust gas and the urea may collide and mix. The mixture of exhaust gas and urea may flow out of the mixer via the plurality of outlets and merge with exhaust gas free of urea. A mixer located in the intake passage may be fixedly located along the intake passage via the EGR tube. A mixer located in the exhaust passage may be fixedly located along the exhaust passage via a bent tube configured to flow urea from a urea reservoir to the injector.

FIG. 2 shows an isometric view of a mixer 200 positioned along an exhaust passage 202 (e.g., exhaust passage 48 in the embodiment of FIG. 1) within an exhaust pipe 204. The mixer 200 may be used similarly to mixer 82 in the embodiment of FIG. 1. Thus, the mixer 200 may be a urea mixer 200 in one example. The urea mixer 200 may be configured to receive a urea injection while simultaneously admitting exhaust gas into a chamber for increasing a urea dispersion in an exhaust flow upstream of a SCR device (e.g., aftertreatment device 72).

An axis system 290 is shown comprising three axes, an x-axis in the horizontal direction, a y-axis in the vertical direction, and a z-axis in a direction perpendicular to both the x and y axes. A central axis 295 of the exhaust pipe 204 and/or exhaust passage 202 is shown by a dashed line. The mixer 200 is located along the central axis 295 and spaced away from the exhaust pipe 204. In one example, the mixer 200 is symmetric about the central axis 295. Therefore, the central axis 295 may also be a central axis of the mixer 200, as an example. An overall direction of exhaust flow is depicted by arrows 298. Arrow 299 depicts a direction of a force of gravity parallel to the y-axis.

The mixer 200 may be a single, continuous, and hollow machined piece. The mixer 200 may be composed of one or more of a ceramic material, a metal alloy, a silicon derivative, or other suitable materials capable of withstanding high temperatures while also mitigating friction experienced by an exhaust flow such that an exhaust pressure is maintained. Additionally or alternatively, the mixer 200 may comprise of one or more coatings and materials such that exhaust may contact surfaces of the mixer 200 without depositing soot or other exhaust gas components on the mixer 200.

The exhaust pipe 204 is tubular and configured to allow the passage of exhaust gas through the exhaust passage 202. The mixer 200 is positioned along the central axis 295 of the exhaust pipe 204, radially spaced away from interior surfaces of the exhaust pipe 204. The mixer 200 may be evenly spaced about the central axis 295 such that the mixer is not biased to upper or lower portions of the exhaust passage 202.

The mixer 200 is teardrop-shaped in one example. The mixer 200 may be eggplant-shaped, oblong, spherical, football-shaped, egg-shaped, pear-shaped, torpedo-shaped, barrel shaped, or other suitable shapes. Thus, a cross-section of the mixer 200 along the y-axis is substantially circular with a distance between the cross-section and the exhaust pipe 204 being substantially constant.

The mixer 200 comprises a maximum diameter located along a central portion of the diameter between upstream and downstream ends. The diameter of the mixer 200 continually decreases along the central axis 295 from the central portion toward the upstream end and the downstream end. A diameter of the mixer 200 at the upstream end is substantially equal to a diameter or the mixer 200 at the downstream end, in one example. A first distance between the upstream end and the maximum diameter is less than a second distance between the downstream end and the maximum diameter. In this way, a slope between the upstream end and the maximum diameter is greater than a slope between the maximum diameter and the downstream end.

An outer exhaust passage 250 is located between the mixer 200 and the exhaust pipe 204. The outer exhaust passage 250 is an annular passage and thereby located around an entire circumference of the mixer 200. The outer exhaust passage 250 may be substantially venturi shaped thereby comprising a venturi inlet 252, a venturi outlet 254, and a venturi throat 256. Thus, in one example, the outer exhaust passage 250 may be an outer venturi passage, where the passage is uninterrupted with no intervening components located therein. Exhaust gas may flow uninterruptedly through the outer exhaust passage 250 without contacting the mixer 200 or the exhaust pipe 204. A cross-section of the outer exhaust passage 250 taken along the y-axis is substantially circular.

A first surface 232, second surface 234, and intersection 236 form the outer surface of the mixer 200. The first surface 232 is upstream of the second surface 234. Thus, the first surface 232 is closer to an engine (e.g., engine 10 of FIG. 1) compared to the second surface 234 relative to a direction of exhaust flow (arrow 298). The first surface 232, the second surface 234, and the intersection 236 are substantially annular and span an entire circumference of the outer surface of the mixer 200. In one example, the first surface 232, second surface 234, and intersection 236 may be the only walls separating an interior of the mixer 200 from the exhaust passage 202.

The first 232 and second 234 surfaces are curved such that a radial distance between the surfaces and the exhaust pipe 204 varies throughout a length of the surfaces along the x-axis. Specifically, the radial distance between the first surface 232 and the exhaust pipe 204 decreases from an upstream edge 231 of the first surface to a downstream edge 233 of the first surface adjacent the intersection 236. Conversely, the distance between the second surface 234 and the exhaust pipe 204 increases from an upstream edge 235 of the second surface 234 adjacent the intersection 236 to a downstream edge 237 of the second surface 234. In one example, the upstream edge 231 and the downstream edge 237 are extreme ends of the mixer 200. The downstream edge 237 is located at the downstream end of the mixer 200, where the downstream end is spherically-rounded in one example. The radial distance between the exhaust pipe 204 and the upstream edge 231 of the first surface 232 is substantially equal to the radial distance between the exhaust pipe 204 and the downstream edge 237 of the second surface 234, in one example. Likewise, the distance between the exhaust pipe 204 and the downstream edge 233 of the first surface 232 is substantially equal to the distance between the exhaust pipe and the upstream edge 235 of the second surface 234. In one example, the upstream edge 231 of the first surface 232 is a most upstream edge and the downstream edge 237 of the second surface 234 is a most downstream edge. In some examples, additionally or alternatively, the radial distance between the upstream edge 231 and the exhaust pipe 204 may be greater than the radial distance between the downstream edge 237 and the exhaust pipe 204.

Additionally or alternatively, a length of the first surface 232 is less than a length of the second surface 234 such that the first surface comprises a more extreme curvature compared to a curvature of the second surface. In this way, an angle $\theta_A$ of the first surface 232 is greater than an angle $\theta_B$ of the second surface 234. Furthermore, a slope of the first surface 232 is greater than a slope of the second surface 234. In this way, the first surface 232 and the second surface 234 may be substantially frustoconically-shaped, where a height of the second surface 234 is greater than a height of the first surface 232. A height of a frustoconical shape is measured from a first circular extreme end to a second circular extreme end.

Intersection 236 is located between the downstream edge 233 of the first surface 232 and the upstream edge 235 of the second surface 234. A radial distance between the intersection 236 and the exhaust pipe 204 may be substantially constant for a length of the intersection measured along the x-axis. In one example, the intersection 236 may correspond a greatest diameter of the mixer 200 and therefore a smallest distance between the exhaust pipe 204 and the mixer 200. A diameter of the mixer 200 decreases from the intersection 236 in upstream and downstream directions, reaching a minimum diameter at the upstream edge 231 and downstream edge 237.

The venturi inlet 252, the venturi outlet 254 and the venturi throat 256 are associated with the first surface 232, the second surface 234, and the intersection 236, respectively. Radii of the venturi inlet 252, the venturi outlet 254, and the venturi throat 256 are inversely related to radii of the first surface 232, the second surface 234, and the intersection 236, respectively. In this way, a radius of the venturi inlet 252 decreases toward the venturi throat 256, where a radius of the venturi throat is a smallest radius of the outer exhaust passage 250. The outer exhaust passage 250 widens in the venturi outlet 254, where a radius of the of the venturi outlet 254 increases from the upstream edge 235 to the downstream edge 237. By shaping the outer exhaust passage 250 in this way, exhaust flow velocity may increase through the venturi inlet 252 and reach a maximum velocity in the venturi throat 256 before decreasing in the venturi outlet 254. Furthermore, pressure and velocity are inversely related through the outer exhaust passage 250 such that pressure decreases through the venturi inlet 252, reaches a lowest pressure in the venturi throat 256, and increases in the venturi outlet 254.

Exhaust gas may enter the interior of the urea mixer 200 through an inlet 262 of the second surface 234. The inlet 262 fluidly couples the interior of the urea mixer 200 to the exhaust passage 202. A size of the inlet 262 may be defined by a circumference of the downstream edge 237 of the second surface 234. Thus, the inlet 262 is a single opening located at an extreme end of the urea mixer 200 symmetric about the central axis 295. In some examples, additionally or alternatively, the second surface 234 may be closed at its extreme end, and where the inlet is a plurality of inlets located between upstream edge 235 and downstream edge 237 along a common axis.

Exhaust gas may flow out of the interior of the urea mixer 200 via a plurality of outlets 264 located along an entire outer circumference of the intersection 236. The outlets 264 are substantially equidistantly spaced away from one another such that a first distance between a first outlet of the outlets 264 and a second outlet of the outlets 264 is substantially equal to a second distance between a third outlet of the outlets 264 and a fourth outlet of the outlets 264. The outlets 264 are aligned along a common plane parallel to the z-axis. The outlets 264 face a radially outward direction toward the exhaust pipe 204 perpendicular to a direction of exhaust flow (arrow 298). As an example, individual outlets of the outlets 264 may be smaller than the inlet 262. In this way, a greater mass of gas may flow through the inlet 262 than through one outlet of the outlets 264. The outlets 264 are located upstream of the inlet 262. This forces exhaust gas to flow in opposite arrow 298 indicating a direction of exhaust flow.

In this way, as exhaust gas flows through the outer exhaust passage 250, a vacuum generated at the venturi throat 256 may be supplied to the interior of the mixer 200. The vacuum may promote exhaust gas to flow through the inlet 262 and enter the interior of the mixer 200. Exhaust gas may flow through an entire interior volume of the mixer 200 before flowing through the outlets 264 and into the outer exhaust passage 250. Vacuum generated at the venturi throat 256 along with exhaust flow through the inlet 262 may promote exhaust gas from the interior of the mixer 200 to flow through the outlets 264 and into the outer exhaust passage 250.

As described above, the urea mixer 200 is configured to receive and expel exhaust gas to and from the exhaust passage 202. The urea mixer 200 is further configured to receive an injection from an injector 220 positioned to inject reductant into the chamber of the mixer. The injector 220 protrudes through an opening 222, at the upstream edge 231 of the first surface 232, located directly across from the inlet 262 along the central axis 295. An injector boss 224 is hermetically sealed to the opening 222, allowing the injector 220 to project therethrough. In one example, the injector 220 is a urea injector. The injector 220 may receive urea through a passage of a bent tube 210 fluidly coupled to a reservoir (e.g., reservoir 88 of FIG. 1).

The bent tube 210 comprises a vertical tube 212 and a horizontal tube 214. A first end 213 of the vertical tube is physically coupled to a boss 218 and a second end 215 of the horizontal tube is physically coupled to the injector boss 224. The vertical tube 212 is parallel to the y-axis and the horizontal tube 214 is parallel to the x-axis (perpendicular to the vertical tube). The tubes join at a turn 216, which may comprise an angle generating a bend in the bent tube 210. The angle of the bent tube 210 may be substantially equal to 90° in one example. It will be appreciated that the angle may be greater than or less than 90°, for example, 135° or 60°. Thus, the bent tube 210 may be L-shaped, C-shaped, V-shaped, or other suitable shapes comprising a bend. In this way, the bent tube 210 extends downwardly from an upstream portion of the exhaust pipe 204 via the vertical tube 212 before turning horizontally in the downstream direction via the horizontal tube. As shown, the vertical tube 212 is longer than the horizontal tube 214, with a diameter of the tubes being substantially equal. Additionally or alternatively, the tubes may be unequal in one or more of length, radius, and thickness. In one example, the vertical tube 212 may be substantially identical to the horizontal tube 214.

The boss 218 along with the bent tube 210 fixedly couple the mixer 200 to the exhaust pipe 204. The boss 218 extends through and may be hermetically sealed with a highest portion of the exhaust pipe 204 via welds, adhesives, and/or other suitable coupling elements. Exhaust gas from the exhaust passage 202 may not flow between the boss 218 and the exhaust pipe 204 into an ambient atmosphere. This may mitigate and/or prevent oscillations or other movements of the urea mixer 200 due to harsh road conditions and/or contact with turbulent exhaust flow. The bent tube 210 is hermetically sealed from the exhaust passage 202 and the mixer 200 such that exhaust gas does not flow into the bent tube, allowing urea free of exhaust gas to flow to the injector 220. As an example, in this way, there are no additional exhaust inlets and different exhaust outlets other than those described.

Exhaust gas may contact outer surfaces of the bent tube 210 before flowing to the first surface 232 as it flows through the exhaust passage. This may allow the bent tube 210 to heat up urea flowing to the injector 220. By doing this, urea may vaporize more effectively thereby improving a mixing ability of the urea. The exhaust gas then flows through the outer exhaust passage, where a first portion continues to flow through the exhaust passage 202 without entering the urea mixer 200. A second portion flows through the inlet 262 and enters the chamber of the urea mixer 200. In one example, the first portion comprises a mass greater than a mass of the second portion of exhaust gas. The second portion of exhaust gas may mix with the urea injection prior to flowing back into the exhaust passage 202 via the outlets 264 as a mixture of urea and exhaust gas. The mixture may merge with exhaust gas free of urea adjacent to the urea mixer 200 in the venturi throat 256. In this way, the urea mixer 200 may increase a dispersion of urea through the exhaust passage 202 upstream of an SCR device, which may improve $NO_x$ reduction at the SCR.

Thus, a urea mixer includes a first surface and a second surface with an intersection located therebetween. The first surface comprises a first opening at an upstream end with an injector positioned therein for injecting reductant into an interior of the mixer. The second surface comprises a second opening at a downstream end for admitting exhaust gas into the interior of the mixer. The first opening and second opening are located along a shared common axis such that a urea injection and exhaust flow through the second opening are in opposite direction in one example. A plurality of perforations are located along the intersection, fluidly coupling the interior of the mixer to an annular venturi passage located between the mixer and an exhaust pipe. The perforations may be associated with a throat of the venturi such that vacuum generated in the throat may be supplied to the interior of the mixer. This may promote exhaust gas to change direction and flow through the second opening into the interior of the mixer. Exhaust gas may flow through the interior of the mixer and mix with urea prior to flowing through the perforations and into the annular venturi passage. Example exhaust flow and urea mixing in the mixer will be described below.

FIG. 3 shows a downstream-to-upstream view 300 of the urea mixer 200 in the embodiment of FIG. 2. Thus, components previously presented may be similarly numbered in subsequent figures. As described above, the urea mixer 200 is stationary and fixedly located inside an exhaust pipe 204 via a bent tube 210 and a boss 218. A first surface (e.g., first surface 232 of FIG. 2) is occluded in the downstream-to-upstream view 300 by the second surface 234.

An axis system 390 includes two axes, an x-axis in the horizontal direction and a y-axis in the vertical direction. Arrow 299 depicts a direction of the force of gravity parallel to the y-axis. Exhaust gas may flow along a central axis of the exhaust pipe 204 in a direction perpendicular to the x- and y-axes.

The urea mixer 200 is located along the exhaust passage 202 and forms an outer exhaust passage 250 between the mixer 200 and the exhaust pipe 204. The outer exhaust passage 250 is venturi shaped and a cross-section of the outer exhaust passage 250 taken along the x- and/or y-axes is circular. A width of the outer exhaust passage 250 varies in association with a change in a radial distance between the mixer 200 and the exhaust pipe 204. Specifically, first width 304 corresponds to a smallest radial distance between the exhaust pipe 204 and the mixer 200. Thus, first width 304 is a smallest width of the outer exhaust passage 250 and corresponds to a venturi throat (e.g., venturi throat 256 of FIG. 2) in one example. Second width 306 corresponds to a largest radial distance between the exhaust pipe 204 and the mixer 200. Thus, second width 306 is a largest width of the outer exhaust passage 250 and corresponds to a most downstream portion of a venturi outlet (e.g., venturi outlet 254 of FIG. 2) in another example. The first width 304 is upstream of the second width 306 relative to exhaust gas flow.

Inlet 262 comprises a circumference equal to a circumference of the downstream edge 237 of the second surface 234. The inlet 262 is located proximal to the central axis of the exhaust pipe 204. Thus, the inlet 262 may admit exhaust gas near the central axis of the exhaust pipe 204. An interior chamber 302 of the mixer 200 is shown through an opening of the inlet 262 with an injector 220 located therein. The injector 220 is concentric with the inlet 262 about the central axis of the exhaust pipe 204. Thus, the central axis of the exhaust pipe 204 traverses through centers of the injector 220 and the inlet 262.

Outlets 264 are located along the circumference of the intersection 236 proximal to the exhaust pipe 204. In this way, the mixer 200 receives exhaust gas along the central axis of the exhaust pipe 204 and expels exhaust gas proximal to the exhaust pipe 204 away from the central axis. As shown, the outlets 264 face a radial outward direction perpendicular to the inlet 262. In one example, a distance between the outlets 264 and the exhaust pipe 204 may be substantially equal to the first width 304. A distance between the inlet 262 and the exhaust pipe 204 may be substantially equal to the second width 306.

FIG. 4 shows a cross-section 400 of the urea mixer 200 in the embodiment of FIG. 2 along the y-axis as shown by cutting plane C-C. Furthermore, the cross-section 400 shows an example exhaust flow through the urea mixer 200. As described above, the urea mixer 200 may promote mixing between exhaust gas and urea upstream of an aftertreatment device 72 (e.g., an SCR device). By increasing a dispersion of urea in an exhaust flow upstream of the SCR, urea may coat the SCR more evenly, ultimately resulting in reduced $NO_x$ emissions.

An axis system 390 is shown comprising two axes, an x-axis parallel to the horizontal direction and a y-axis parallel to the vertical direction. Arrow 298 depicts a general direction of exhaust flow in the exhaust passage 202. Arrow 299 depicts a direction of the force of gravity. A central axis 295 of the exhaust pipe 204 parallel to the x-axis is shown. Black head arrows indicate exhaust gas free of urea in the exhaust passage 202. White head arrows indicate exhaust gas mixed with urea in the exhaust passage 202.

Exhaust gas flows through an upstream portion 402 of the exhaust passage 202 prior to reaching the urea mixer 200. A majority of exhaust gas in the upstream portion 402 may flow uninterruptedly without contacting the bent tube 210.

Thus, a remaining portion of exhaust gas in the upstream portion 402 contacts outer surfaces of the bent tube 210, thermally communicating with the bent tube without flowing into a passage 416 of the bent tube. Exhaust gas from the upstream portion 402 flows into a venturi inlet 252 located outside an entire circumference of the first surface 232 between upstream edge 231 and downstream edge 233. Exhaust gas in the venturi inlet increases in velocity and decreases in pressure as the venturi inlet 252 constricts in the downstream direction. Exhaust gas in the venturi inlet does not enter the chamber 302 of the urea mixer 200, in one example.

Exhaust gas in the venturi inlet 252 may contact the first surface 232 and the exhaust pipe 204 prior to flowing into the venturi throat 256. Exhaust gas velocity may reach a maximum velocity and exhaust gas pressure may reach a minimum pressure when flowing through the throat 256. Thus, the throat 256 may correspond to a narrowest portion of the outer exhaust passage 250. In one example, exhaust gas in the throat 256 flows into the venturi outlet 254 without flowing through the outlets 264 and into the chamber 302. This may be due to the increased velocity of the exhaust gas. A maximum velocity and a minimum pressure are relative to velocities and pressures generated in the outer exhaust passage 250 (e.g., the venturi passage) and do not account for velocities and pressures generated outside the outer exhaust passage 250. Vacuum generated in the throat 256 is fluidly coupled to the interior chamber 302 via the outlets 264.

Exhaust gas from the throat 256 flows into the venturi outlet 254, where the velocity of the exhaust gas decreases and the pressure increases. Exhaust gas in the venturi outlet 254 may contact the exhaust pipe 204 and/or the second surface 234. Alternatively, exhaust gas may flow uninterruptedly through the venturi outlet 254 without contacting either of the second surface 234 or the exhaust pipe 204. Exhaust gas flows out of the venturi outlet 254 and into a downstream exhaust passage 404 located between the mixer 200 and the aftertreatment device 72. Exhaust gas distal to the central axis 295 may flow through the downstream exhaust passage 404 without entering the interior chamber 302. Exhaust gas proximal to the central axis 295 may be drawn through the inlet 262 and into the interior chamber 302 via a vacuum supplied to the mixer 200 from the throat 256 through the outlets 264. The vacuum is generated by flowing exhaust gas through the venturi throat 256, where the vacuum is fluidly coupled to the interior chamber 302 via the outlets 264. The vacuum promotes exhaust gas to flow through the inlet 262 by turning the exhaust gas in a plurality of directions into the interior chamber 302. Exhaust gas flowing through the inlet 262 may flow in a plurality of directions including at least a first direction opposite a direction of exhaust flow in the exhaust passage 202 (e.g., arrow 298). Exhaust gas in the interior chamber 302 may flow through an entire volume of the interior chamber 302 before flowing through the outlets 264. Exhaust gas flows radially outward through the outlets 264 and enters the venturi throat 256 at a plurality of angles including at least a first angle perpendicular to arrow 298.

Additionally or alternatively, the injector 220 may inject urea into the interior chamber 302. Urea flows from the reservoir 88 and through the passage 416 of the bent tube 210 before reaching the injector 220. Specifically, urea flows through the vertical tube 212 in a downward direction through the passage 416 before turning at an angle corresponding to an angle of the turn 216, and flowing in a downstream direction through the horizontal tube 214 to the injector 220. A urea injection 420 is along a central axis 295 of the exhaust pipe 204 in a direction parallel arrow 298, in one example. By injecting the urea in this way, the urea is less likely to impinge onto interior surfaces of the mixer 200, due to its distance from interior surfaces of the mixer 200, while also increasing a mixing ability/turbulence of the urea and exhaust gas in the interior chamber 302. In some embodiments, the injector 220 may inject at an angle oblique to the central axis 295. Exhaust gas mixed with urea may flow through the outlets 264 and mix with exhaust gas free of urea. Thus, the exhaust gas mixed with urea flows radially outward from the mixer 200 and flows proximal to the exhaust pipe 204 before moving radially inward and flowing along a greater number of regions of the exhaust passage 202 downstream of the mixer 200 and upstream of the aftertreatment device 72. In this way, exhaust gas mixed with urea flows adjacent to the exhaust pipe 204, the central axis 295, and regions of the exhaust passage 202 located therebetween.

Thus, FIGS. 2-4 depict a mixer configured to admit exhaust gas into an interior chamber fluidly coupled to an injector capable of injecting urea. Exhaust gas is drawn into the mixer through an inlet located on a farthest downstream portion of the mixer. Exhaust gas is drawn into the interior chamber via a vacuum generated in an outer venturi passage located between the mixer and the exhaust pipe. The vacuum may be supplied to the interior chamber through perforations of the mixer as exhaust flows through the venturi passage. Urea may be injected into the interior chamber in a direction opposite a direction of exhaust flow admitted into the interior chamber. By injecting urea in this way, turbulence may increase in the interior chamber thereby improving a mixing of urea with exhaust gas. A mixture of exhaust gas and urea flows through the outlets and back into the exhaust passage, where the mixture may merge with exhaust gas free of urea. The mixture may be more turbulent than the exhaust gas free of urea, which may increase an overall turbulence of exhaust gas in the exhaust passage. In this way, urea flow to an aftertreatment device (e.g., SCR device) may be more homogenous and coat a greater number and/or area of surfaces of the SCR device.

FIG. 5 shows a mixer 500 located along an intake passage 502. The mixer 500 may be used similarly to mixer 80 in the embodiment of FIG. 1. The mixer 500 is contiguous and physically coupled to an EGR pipe 506 protruding into the intake passage 502 through an intake pipe 504. The mixer 500 is hollow, with an interior chamber configured to receive EGR and ambient air.

An axis system 590 is shown comprising three axes, an x-axis parallel to the horizontal direction, a y-axis parallel to the vertical direction, and a z-axis perpendicular to both the x- and y-axes. A central axis 595 is a central axis of the intake pipe 504 parallel to the x-axis. The mixer 500, excluding the EGR pipe 506, is symmetric about the central axis 595. A central axis 596 is a central axis of the EGR pipe 506 parallel to the y-axis. Arrow 598 depicts a direction of ambient air flow. Arrow 599 depicts a direction of the force of gravity.

The mixer 500 may be substantially similar to the mixer 200 described above with one or more deviations described herein. For example, a first opening 522 of the mixer 500 may be open, whereas a corresponding opening (e.g., opening 222) of the mixer 200 is hermetically sealed via an injector boss 224 and an injector 220 located therein. Thus, intake air (ambient air) may flow through the first opening 522 while exhaust gas may not flow through the opening 222. Furthermore, the mixer 500 is fluidly coupled to an EGR passage (e.g., EGR passage 152 of FIG. 1) via the EGR pipe 506 physically coupled to a downstream surface 534 of the mixer 500. Conversely, the mixer 200 is only physically coupled to a bent tube 210 at the upstream edge 231 of the first surface 232 in one example. Thus, a second surface 234 of the mixer 200 is uninterrupted. In this way, the mixer 500 may be an EGR mixer configured to receive EGR and ambient air, while the mixer 200 is a urea mixer as described above. For these reasons, components previously introduced in the embodiment of FIG. 2 may be compared to components of the mixer 500.

The EGR mixer 500 comprises an upstream surface 532 and a downstream surface 534 with an intersection 536 located therebetween. In one example, the upstream surface 532 the downstream surface 534, and the intersection 536 are substantially similar to upstream 232 and downstream 234 surfaces and the intersection 236, respectively, of the mixer 200 in the embodiment of FIG. 2. Specifically, a curvature of the surfaces of the mixer 500 are substantially similar to the curvature of the surfaces of the mixer 200. Thus, an outer intake passage 550 located between the intake pipe 504 and the mixer 500 is substantially similar to the outer exhaust passage 250 located between the exhaust pipe 204 and the mixer 200. In this way, the outer intake passage 550 may also function as a venturi passage comprising a venturi inlet 552, a venturi outlet 554, and a venturi throat 556.

In some examples, additionally or alternatively, the EGR mixer 500 and intake pipe 504 are sized substantially identically to the urea mixer 200 and the exhaust pipe 204. Therefore, the outer intake passage 550 may also be sized similarly to outer exhaust passage 250

The downstream surface 534 of the mixer 500 deviates from the second surface 234 of the mixer 200 due to aperture 566, which allows EGR to flow from the EGR pipe 506 into an interior chamber of the mixer 500. Thus, the downstream surface 534 comprises an opening which the second surface 234 does not. However, all other portions of the downstream surface 534 may be substantially identical to the second surface 234 in one example.

In some embodiments, aperture 566 may be omitted. The EGR pipe 506 may be shaped similarly to bent tube 210 and fluidly coupled to the interior chamber of the mixer 500 via the first opening 522. In such an example, the downstream surface 534 and EGR tube 506 are substantially identical to second surface 234 and bent tube 210, respectively.

The EGR pipe 506 extends through the intake pipe 504 and holds the EGR mixer 500 along the central axis 595 of the intake pipe 504. Welds, adhesives, and/or other suitable coupling elements may physically couple the EGR pipe 506 to one or more of the intake pipe 504 and the downstream surface 534. The EGR pipe 506 is physically coupled to mixer 500 between the upstream edge 235 and the downstream edge 537. In one example, the EGR pipe 506 is located closer to the upstream edge 235 than the downstream edge 537. In other examples, the EGR pipe 506 is located in the middle of the edges or closer to the downstream edge 237 compared to the upstream edge 235. The mixer 500 symmetrically spaced about the central axis 595. In one example, an orientation of the EGR mixer 500 in the intake pipe 504 is substantially similar to an orientation of the urea mixer 200 in the exhaust pipe 204.

A circumference of the first opening 522 is substantially equal to a circumference of the upstream edge 531. Similarly, a circumference of a second opening 562 is substantially equal to a circumference of the downstream edge 537. The first opening 522 is spaced away from and located directly upstream of the second opening 562 along the central axis 595. In one example, the first opening 522 may be an inlet configured to admit intake air into the mixer 500 and the second opening 562 may be an outlet configured to expel intake air and/or EGR from the mixer 500 to the intake passage 502. As an example, the first opening 522 is substantially identical to the second opening 562 in size. In other examples, the first opening 522 is bigger than or smaller than the second opening 562.

The mixer 500 further comprises a plurality of perforations 564 located along the intersection 536 between downstream edge 533 and upstream edge 535. The perforations 564 may be shaped and function substantially similarly to the outlets 264 of the mixer 200. Thus, intake air and/or EGR may flow from the interior chamber of the mixer 500, through the perforations 564, and into the outer intake passage 550. Furthermore, a vacuum generated at the venturi throat 556 may be fluidly coupled to the interior chamber of the mixer 500, where the vacuum may aid in flowing gas through the perforations 564 and/or for flowing EGR from the EGR pipe 506 into the interior chamber, as will be elaborated below.

FIG. 6 shows a downstream view 600 of the mixer 500 of FIG. 5. Thus, components previously introduced may be similarly number in subsequent figures. As described above, the mixer 500 is stationary and fixedly located inside an intake pipe 504 via an EGR tube 506. An upstream surface (e.g., upstream surface 532 of FIG. 5) is occluded in the downstream view 600 by the second surface 234.

An axis system 690 includes two axes, an x-axis in the horizontal direction and a y-axis in the vertical direction. Arrow 599 depicts a direction of the force of gravity. Intake air may flow along the intake pipe 504 in a direction perpendicular to the x- and y-axes.

As shown, the EGR pipe 506 perpendicularly intersects the downstream surface 534 between the downstream edge 537 and the intersection 536. In one example, the EGR pipe 506 extends through a highest portion of the intake pipe 504 for a vehicle on the ground. In this way, EGR travels in a downward direction with gravity into the EGR mixer 500.

The second opening 562 is directly in front of and spaced away from a first opening (e.g., first opening 522). An interior chamber 602 is located between the first and second 562 openings. In this way, intake air may flow directly through the first opening, through the interior chamber 602 along a central axis of the intake pipe 504, and out the second opening 562 back into the intake passage 502. The interior chamber 602 may be substantially identical to the interior chamber 302 of FIGS. 3 and 4 in size and shape.

FIG. 7 shows a cross-sectional view 700 of the EGR mixer 500 according to double headed arrows M-M. An example intake air flow and EGR flow are shown but solid line arrows and dashed line arrows, respectively. The EGR mixer 500 is configured to promote a mixing between the intake air and the EGR so that EGR performance may flow more evenly through an intake manifold 44.

An axis system 690 includes two axes, an x-axis in the horizontal direction and a y-axis in the vertical direction. A central axis 595 of the intake pipe 504 is shown by a dashed line. Arrow 598 indicates a general direction of intake air flow. Arrow 599 depicts a direction of the force of gravity.

Intake air in the intake passage 502 may flow from an upstream portion 702 of the intake passage to either the mixer 500 or the outer intake passage 502. Intake air may enter the EGR mixer 500 via the first opening 522 located along the central axis 595. Thus, a remaining portion of intake air distal to the central axis 595 flows into the venturi inlet 552 of the outer intake passage 550. Intake air in the venturi inlet 552 may flow through the venturi throat 556, where a vacuum is generated, and into the venturi outlet 554 before reaching a downstream portion 704 of the intake passage 502. Intake air flowing through the first opening 522 enters the interior chamber 602, where the intake air may mix with EGR before flowing out of the interior chamber 602 via the perforations 564 or the second opening 562. In one example, intake air may flow directly through the interior chamber 602 from the first opening 522 to the second opening 562 due its momentum. As another example, intake air may flow out of the perforations 564 and into the venturi throat 556 due to the vacuum generated at the throat 556.

EGR may flow from the EGR system 140, through an EGR passage 152 located in an EGR pipe 506, through an aperture 566, and into the interior chamber 602. In one example, all of the EGR from the EGR system 140 flows through the mixer 500 before entering the intake passage 502. The EGR flows in a direction normal to arrow 298 indicating a direction of intake air flow. This may increase a turbulence generated when EGR and intake air collide in the EGR mixer further promoting a dispersion of EGR. The EGR may flow out of the interior chamber 602 via the perforations 564 or the second opening 562. The perforations 564 may direct EGR and/or intake air in a radially outward direction perpendicular to arrow 298 in a region of the intake passage 502 proximal to the intake pipe 504. The second opening 562 may direct EGR and/or intake air in a direction parallel to arrow 298 in a region of the intake passage 502 proximal to the central axis 595. Furthermore, turbulence generated in the interior chamber 602 may be carried into the outer intake passage 550 or the downstream portion 704 of the intake passage 502, which may allow the EGR to flow to a greater number of regions of the intake passage 502. This may allow EGR to be evenly distributed throughout the intake passage 502 so that it may be evenly delivered to each desired cylinder of an engine (e.g., engine 10 of FIG. 1).

As described above, the EGR pipe 506 is closer to the perforations 564 than it is to the second opening 562. Thus, the vacuum supplied from the venturi throat 556 to the interior chamber 602 via the perforations 564 may assist EGR flow from the EGR passage 152 into the interior chamber 602. As an example where a manifold pressure is high (e.g., during high engine load), EGR flow out of the EGR passage 152 may be inhibited. However, the vacuum generated in the venturi throat 556 may compensate for the high manifold pressure and maintain an EGR flow into the mixer 500.

Thus, a first mixer may be used in an intake passage and a second mixer may be used in an exhaust passage. The mixers comprising first and second openings located along a central axis of their respective passages. The mixers further comprise a plurality of perforations located along an intersection between first and second surfaces. The first and second surfaces are curved in such a way that a passage between a pipe and the mixer functions as a venturi passage. A throat of the venturi passage is associated with the perforations such that vacuum generated in the venturi passage may be supplied to an interior chamber of the mixer. In one example, the first mixer is an EGR mixer further comprising an aperture in its second surface proximal to the perforations, where the aperture is configured to receive EGR gas from an EGR passage. The first mixer is fixedly supported in the intake passage by an EGR tube extending through an upper portion of an intake passage and physically coupled to the second surface. Thus, the first mixer may receive intake air through the first opening and EGR through the second opening, while expelling EGR and/or intake air through the perforations and/or the second opening. As another example, the second mixer is a urea mixer further comprising a urea injector protruding through the first opening. The second mixer is fixedly supported in the exhaust passage via a bent tube extending from an upper portion of an exhaust passage, physically coupled to the first surface of the mixer. The second mixer may receive a urea injection from the injector in the first opening while receiving exhaust gas through the second opening. The urea and/or exhaust gas may flow out an interior chamber of the mixer via the perforations.

Thus, a mixer may be used in an intake passage and/or exhaust passage, where the mixer may be configured to promote EGR mixing or urea mixing, respectively. The mixer may be compact and easy-to-manufacture thereby reducing an engine size and manufacturing costs. The technical effect of using a compact mixer is to improve vehicle performance without the addition of electric controllers and/or actuators. Thus, a mechanically operated mixer may improve vehicle performance without increase a size of vehicle components.

A first embodiment of a system comprising a hollow teardrop-shaped mixer comprising an inlet at a downstream spherically-rounded end and a plurality of outlets located along a maximum diameter of the mixer, the mixer radially spaced away from a pipe, a diameter of the mixer along a central axis continually decreases from the maximum diameter to upstream and downstream ends relative to a direction of gas flow. A first example of the system further comprises where a distance between the maximum diameter and the upstream end being a first distance and a distance between the maximum diameter and the downstream end is a second distance, and where the first distance is less than the second distance. A second example of the system optionally including the first example further comprises where the diameter decreases at a first rate from the maximum diameter to the upstream end, and where the diameter decreases at a second rate from the maximum diameter to the downstream end, where the first rate is greater than the second rate. A third example of the system optionally including one or more of the first through second examples further comprises where an outer passage located between the mixer and the pipe, where the outer passage functions as a venturi passage, and where a throat of the venturi is adjacent to the plurality of outlets. A fourth example of the system optionally including one or more of the first through third examples further includes where the pipe is an exhaust pipe and the mixer is a urea mixer, the urea mixer is configured to receive exhaust gas through the downstream opening into an internal chamber. A fifth example of the system optionally including one or more of the first through fourth examples further includes where the urea mixer further comprising an injector protruding through an upstream opening, the injector positioned to inject urea into an interior space of the mixer. A sixth example of the system optionally including one or more of the first through fifth examples further includes where a bent tube is physically coupled to the exhaust pipe and the urea mixer, the bent tube fixedly supporting the urea mixer along a central axis of the exhaust pipe. A seventh example of the system optionally including one or more of the first through sixth examples further includes where the pipe is an intake pipe and the mixer is an EGR mixer, the EGR mixer is configured to the receive EGR through an EGR tube physically coupling the EGR mixer to the intake pipe. An eighth example of the system optionally including one or more of the first through seventh examples further includes where the EGR mixer comprises an upstream opening at the upstream end located directly across from the downstream end, and where the upstream opening may admit intake air and the downstream opening and plurality of outlets may expel intake air.

An embodiment of an exhaust system comprising a symmetric fixed urea mixer located along a central axis inside an exhaust pipe with a first opening located across and aligned with a second opening along the central axis, a plurality of perforations located along a largest circumference of the mixer, and an injector protruding through the first opening, the injector fluidly coupled to a reservoir via a tube. A first example of the exhaust system further comprises where the tube is a bent tube comprising a vertical tube and a horizontal tube, where the vertical tube is physically coupled to the exhaust pipe and the horizontal tube is physically coupled to the mixer. A second example of the exhaust system optionally including the first example further comprises where the first opening is upstream of the second opening relative to a direction of exhaust flow, the second opening configured to admit exhaust gas into an interior space of the urea mixer via a vacuum supplied from an annular venturi passage located between the urea mixer and the exhaust pipe. A third example of the exhaust system optionally including the first and/or second examples further comprising where exhaust gas flows through the second opening into the interior space in a plurality of directions including a first direction which is opposite a direction of exhaust gas flow. A fourth example of the exhaust system optionally including one or more of the first through third examples further includes where the injector injects urea in a direction opposite to the first direction.

An embodiment of an intake system comprising a symmetric fixed EGR mixer located along a central axis inside an intake pipe with a first opening located across and aligned with a second opening along the central axis, a plurality of perforations located along a largest circumference of the mixer, and an EGR pipe extending through the intake pipe physically coupled to a surface of the EGR mixer configured to flow EGR to an interior chamber of the mixer. A first example of the intake system further comprises where the surface is a downstream surface, and where the downstream surface is physically coupled to an upstream surface via an intersection located therebetween, the intersection corresponding to the largest circumference of the mixer. A second example of the intake system optionally including the first example further includes where the first opening is located at an upstream extreme end of the mixer and the second opening is located at a downstream extreme end of the mixer, and where the perforations are located closer to the first opening compared to the second opening. A third example of the intake system optionally including one or more of the first and second examples further includes where the EGR pipe is proximal to the plurality of perforations and distal to the second opening. A fourth example of the intake system optionally including one or more of the first through third examples further includes where the perforations fluidly connect the interior space of the mixer to a vacuum generating portion of an outer intake passage located between the mixer and the intake pipe. A fifth example of the intake system optionally including one or more of the first through fourth examples further includes where the mixer comprises no other inlets or additional outlets other than those described.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a hollow teardrop-shaped mixer comprising an inlet opposite a downstream spherically-rounded end and a plurality of outlets located along a maximum diameter of the mixer, the mixer radially spaced away from a pipe, a diameter of the mixer along a central axis continually decreases from the maximum diameter to upstream and downstream ends relative to a direction of gas flow.

2. The system of claim 1, further comprising a distance between the maximum diameter and the upstream end being a first distance and a distance between the maximum diameter and the downstream end being a second distance, and where the first distance is less than the second distance.

3. The system of claim 1, wherein the diameter decreases at a first rate from the maximum diameter to the upstream end, and where the diameter decreases at a second rate from the maximum diameter to the downstream end, where the first rate is greater than the second rate.

4. The system of claim 1, further comprising an outer passage located between the mixer and the pipe, where the outer passage functions as a venturi passage, and where a throat of the venturi is adjacent to the plurality of outlets.

5. The system of claim 1, wherein the pipe is an exhaust pipe and the mixer is a urea mixer, the urea mixer is configured to receive exhaust gas through the downstream opening into an internal chamber.

6. The system of claim 5, wherein the urea mixer further comprising an injector protruding through an upstream opening, the injector positioned to inject urea into an interior space of the mixer.

7. The system of claim 5, further comprising a bent tube physically coupled to the exhaust pipe and the urea mixer, the bent tube fixedly supporting the urea mixer along a central axis of the exhaust pipe.

8. The system of claim 1, wherein the pipe is an intake pipe and the mixer is an EGR mixer, the EGR mixer is configured to the receive EGR through an EGR tube physically coupling the EGR mixer to the intake pipe.

9. An intake system comprising:
  a symmetric fixed EGR mixer located along a central axis inside an intake pipe with a first opening located across and aligned with a second opening along the central axis;
  a plurality of perforations located along a largest circumference of the mixer;
  an EGR pipe extending through the intake pipe physically coupled to a surface of the EGR mixer configured to flow EGR to an interior chamber of the mixer; and
  wherein the first opening is located at an upstream extreme end of the mixer and the second opening is located at a downstream extreme end of the mixer, and where the perforations are located closer to the first opening compared to the second opening.

10. The intake system of claim 9, wherein the surface is a downstream surface, and where the downstream surface is physically coupled to an upstream surface via an intersection located therebetween, the intersection corresponding to the largest circumference of the mixer.

11. The intake system of claim 9, wherein the EGR pipe is proximal to the plurality of perforations and distal to the second opening.

12. The intake system of claim 9, wherein the perforations fluidly connect the interior space of the mixer to a vacuum generating portion of an outer intake passage located between the mixer and the intake pipe.

* * * * *